United States Patent
Schwing et al.

(10) Patent No.: US 10,713,244 B2
(45) Date of Patent: Jul. 14, 2020

(54) CALCULATION ENGINE OPTIMIZATIONS FOR JOIN OPERATIONS UTILIZING AUTOMATIC DETECTION OF FORCED CONSTRAINTS

(71) Applicant: SAP SE, Walldorf (DE)

(72) Inventors: Julian Schwing, Heidelberg (DE); Johannes Merx, Heidelberg (DE); Christoph Weyerhaeuser, Leimen (DE)

(73) Assignee: SAP SE, Walldorf (DE)

( * ) Notice: Subject to any disclaimer, the term of this patent is extended or adjusted under 35 U.S.C. 154(b) by 444 days.

(21) Appl. No.: 15/150,371

(22) Filed: May 9, 2016

(65) Prior Publication Data
US 2017/0322952 A1 Nov. 9, 2017

(51) Int. Cl.
*G06F 16/2453* (2019.01)

(52) U.S. Cl.
CPC ................ *G06F 16/2453* (2019.01)

(58) Field of Classification Search
CPC ......... G06F 17/30339; G06F 17/30289; G06F 16/2453
USPC ........................................................ 707/714
See application file for complete search history.

(56) References Cited

U.S. PATENT DOCUMENTS

| | | | | |
|---|---|---|---|---|
| 5,899,986 A * | 5/1999 | Ziauddin | ............. | G06F 16/2462 |
| 6,882,993 B1 * | 4/2005 | Lawande | ............. | G06F 16/2393 |
| | | | | 707/714 |
| 7,092,954 B1 * | 8/2006 | Ramesh | ............. | G06F 16/2456 |
| | | | | 707/714 |
| 2004/0215626 A1 * | 10/2004 | Colossi | ............. | G06F 16/24542 |
| 2006/0242115 A1 * | 10/2006 | Baras | ............. | G06F 8/437 |
| 2008/0155641 A1 * | 6/2008 | Beavin | ............. | G06F 16/217 |
| | | | | 726/1 |
| 2008/0222087 A1 * | 9/2008 | Balmin | ............. | G06F 16/8365 |
| 2009/0133110 A1 * | 5/2009 | Kumar | ............. | H04L 29/12122 |
| | | | | 726/8 |
| 2011/0137890 A1 * | 6/2011 | Bestgen | ............. | G06F 16/24544 |
| | | | | 707/719 |
| 2011/0219044 A1 * | 9/2011 | Peukert | ............. | G06F 16/367 |
| | | | | 707/805 |
| 2011/0258179 A1 * | 10/2011 | Weissman | ............. | G06F 16/24544 |
| | | | | 707/714 |
| 2013/0138630 A1 * | 5/2013 | Yang | ............. | G06F 16/2453 |
| | | | | 707/716 |

(Continued)

*Primary Examiner* — Pierre M Vital
*Assistant Examiner* — Nargis Sultana
(74) *Attorney, Agent, or Firm* — Mintz Levin Cohn Ferris Glovsky and Popeo, P.C.

(57) ABSTRACT

A calculation engine of a database management system is described. In some implementations, the calculation engine receives a calculation scenario including a plurality of join operations defining an intersection between at least two nodes. The calculation engine optimizes a first join which is of a certain cardinality, and for which no attributes are requested, other than a join attribute. The optimization includes determining whether a static filter is present for a first node or a second node of the first join, and pruning the first node and/or the second node from the hierarchical join when the attribute is not requested from the first node or the second node and/or when the static filter is not present for the first node or the second node. Related systems, methods, and articles of manufacture are also described.

16 Claims, 7 Drawing Sheets

(56) References Cited

U.S. PATENT DOCUMENTS

| | | | |
|---|---|---|---|
| 2013/0246480 A1* | 9/2013 | Lemcke | G06Q 10/10 707/797 |
| 2014/0365465 A1* | 12/2014 | Weyerhaeuser | G06F 16/335 707/714 |
| 2014/0372365 A1* | 12/2014 | Weyerhaeuser | G06F 16/2456 707/602 |
| 2015/0032777 A1* | 1/2015 | Dietrich | G06Q 10/067 707/798 |
| 2015/0134670 A1* | 5/2015 | Liu | G06F 16/20 707/741 |
| 2015/0142773 A1* | 5/2015 | Mindnich | G06F 16/24544 707/714 |
| 2015/0142774 A1* | 5/2015 | Mindnich | G06F 16/24544 707/714 |
| 2015/0278306 A1* | 10/2015 | Cheng | G06F 16/24545 707/714 |
| 2016/0078064 A1* | 3/2016 | Sassin | G06F 16/211 707/606 |
| 2016/0179894 A1* | 6/2016 | Gupta | G06F 16/275 707/714 |

\* cited by examiner

CALCULATION ENGINE OPTIMIZATIONS FOR JOIN OPERATIONS UTILIZING AUTOMATIC DETECTION OF FORCED CONSTRAINTS

TECHNICAL FIELD

The subject matter described herein relates to calculation engine optimizations for join operations utilizing automatic detection of forced constraints.

BACKGROUND

Calculation scenarios can include hierarchical join operations. A hierarchical join includes a plurality of join operations, each executed in a hierarchical manner, with one join operation serving as a root node, and the remaining join operations serving as child nodes. Each of the leaves in the hierarchical join can include data (e.g., from a database). When executed, the hierarchical join provides an intersection of a plurality of datasources. Calculation scenarios utilizing hierarchical joins can produce useful results (e.g., data tables). However, the generation and processing of hierarchical joins can require a large amount of computation time and result in unnecessary slowdown of the execution of queries. Thus, optimizations of hierarchical joins may be desired.

SUMMARY

A calculation engine of a database management system is described. In some implementations, the calculation engine receives a calculation scenario. The calculation scenario includes a hierarchical join comprising a plurality of join operations defining an intersection between at least two nodes in the hierarchical join. The calculation engine determines whether a cardinality of a first join of the plurality of join operations is above a threshold. If so, the calculation engine optimizes the first join. This optimization includes determining whether an attribute, other than a join attribute, is requested from a first node of the first join or a second node of the first join, the at least two nodes comprising the first node and the second node, detecting whether a static filter is present for the first node or the second node, and pruning the first node and/or the second node from the hierarchical join when the attribute is not requested from the first node or the second node and/or when the static filter is not present for the first node or the second node.

In some implementations, the above-noted aspects may further include features described herein, including one or more of the following: Pruning the first node from the hierarchical join when the attribute is not requested from the first node and the static filter is not present for the first node. The attribute comprises a field within a resulting first data table of the first node or second data table of the second node, and the join attribute comprises a field common between the first data table and the second data table. The first node and the second node each comprise at least one of a second join from the plurality of join operations, a first database partition from a plurality of database partitions, and a relational operation other than a join operation. The plurality of database partitions comprise table partitions that hold data from a database. Detecting whether the static filter is present for the first node or the second node comprises determining whether the first join comprises the static filter, where the static filter comprises a filter of the first node or the second node based on a specified alphanumeric constraint. Determining whether any node in a sub-graph of the first node comprises a static filter, and/or may determining whether any node in a sub-graph of the second node comprises a static filter The optimizing the first join further comprises caching an indication that the static filter is present, when the static filter is detected. The cardinality comprises an indication of a number of rows matching between resulting tables of the first node and the second node.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

Like reference symbols in the various drawings indicate like elements.

DETAILED DESCRIPTION

Calculation scenarios utilizing hierarchical joins can produce useful results. However, hierarchical joins can consume a significant amount of processing power, slowing down the execution of the calculation scenarios. The current subject matter is directed to processing calculation scenarios such that unnecessary operations or calculations within hierarchical joins are reduced and processing time is decreased.

Figure 1:
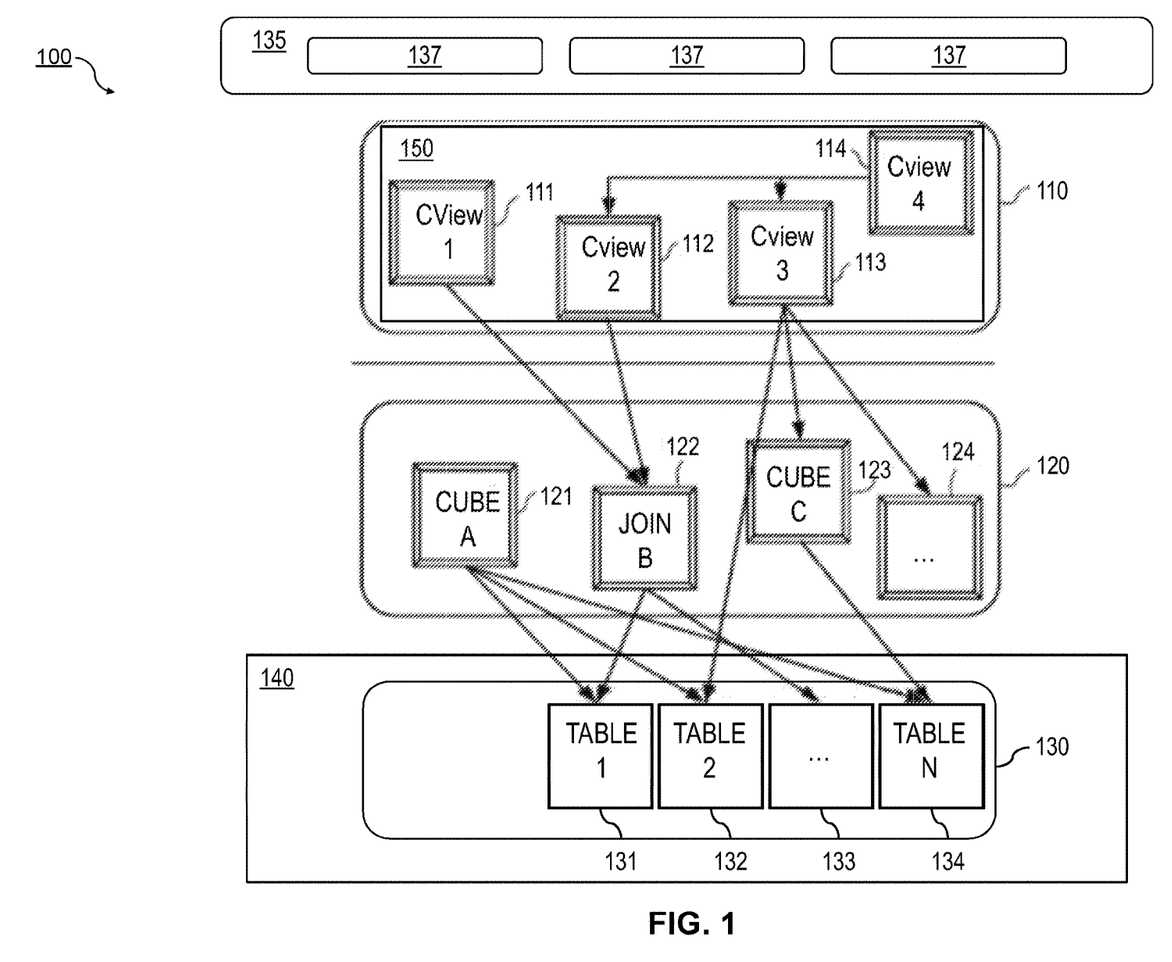
FIG. 1 is a diagram illustrating a computer architecture including a database system that includes three layers.

FIG. 1 is a diagram that illustrates a computing architecture 100 including a database system that includes three layers: a calculation engine layer 110, a logical layer 120, and a physical table-pool 130. One or more application servers 135 implementing database client applications 137 may access the database system 100. Calculation scenarios may be executed by a calculation engine, which may form part of a database or which can be part of the calculation engine layer 110 (which is associated with the database). The calculation engine layer 110 can be based on and/or interact with the other two layers, the logical layer 120 and/or the physical table pool 130. The basis of the physical table pool 130 consists of physical tables (called indexes) containing the data, which can be stored on one more database servers 140. Various tables 131-134 can be joined using logical metamodels 121-124 defined by the logical layer 120 to form an index. For example, the tables 131-134 in the illustrated Cube$_A$ metamodel 121 (e.g., an online analytical processing or "OLAP" index or other type of data structure) can be assigned roles (e.g., fact or dimension tables) and be joined to form a star schema or other type of schema. It is also possible to form join indexes (e.g. the Join$_B$ metamodel 122 in FIG. 1), which can act like database views in computing environments, such as the Fast Search Infrastructure (FSI) available from SAP SE of Walldorf, Germany.

As stated above, a calculation scenario 150 can include individual nodes 111-114 (e.g., calculation views), which in turn each define operations such as joining various physical or logical indexes and other calculation views (e.g., the CView$_4$ node 114 is illustrated as a join of the CView$_2$ node 112 and the CView$_3$ node 113). That is, the input for a node 111-114 can be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations can be operations that are not part of the standard relational engine's programming language (e.g., SQL standard) or may otherwise not be expressed in the programming language. For example, operations that can loop over intermediate results, scripted views/operators, procedural logic, currency conversion, multiproviders, and/or the like are considered non-relational operations.

In a calculation scenario 150 and/or calculation view node 111-114, two different representations can be provided including a pure calculation scenario in which all possible attributes are given and an instantiated model (also referred to herein as "optimized calculation scenario") that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150. Similarly, calculation views (e.g., nodes 111-114) may be created so that they may be reused in multiple calculation scenarios 150. This reusability can provide for simplified development of database queries.

Every calculation scenario 150 can be uniquely identifiable by a name (e.g., the calculation scenario 150 can be a database object with a unique identifier or some other indicia). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
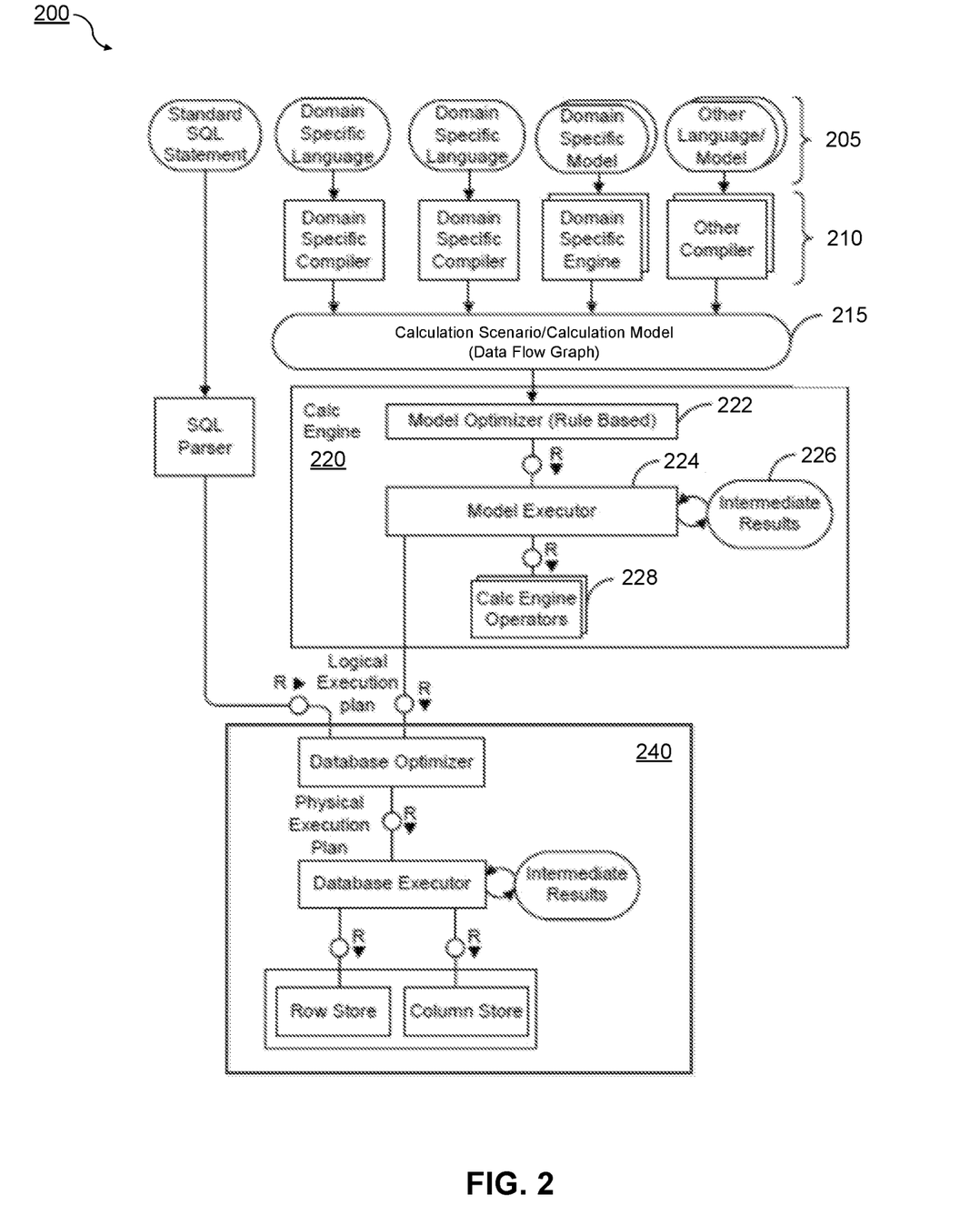
FIG. 2 is a functional block diagram illustrating a sample architecture for request processing and execution control.

FIG. 2 is a diagram illustrating a sample architecture 200 for request processing and execution control. As shown in FIG. 2, artifacts 205 in different domain specific languages can be translated by their specific compilers 210 into a common representation called a "calculation scenario" 215 (which may also referred to as a calculation model). These calculation scenario 215 may be similar to the calculation scenario 150 of FIG. 1. To achieve enhanced performance, the models and programs written in these languages can be executed inside a database server 240 (which may be similar to the database server 140 of FIG. 1). This arrangement eliminates the need to transfer large amounts of data between the database server 240 and a client application 137, which may be executed by the application server 135. Once the different artifacts 205 are compiled into this calculation scenario 215, they can be processed and executed in the same manner. For example, a calculation engine 220 may optimize and/or execute the calculation scenarios 215. At least a portion of the illustrated architecture 200 may be implemented as a database management system (e.g., not including the artifacts 205).

A calculation scenario 215 can be represented as a directed acyclic graph with arrows representing data flows and nodes that represent operations. Each node includes a set of inputs and outputs and an operation (or optionally multiple operations) that transforms the inputs into the outputs. In addition to their primary operation, each node may also include a filter condition for filtering the result set. The inputs and the outputs of the operations can be table valued parameters (i.e., user-defined table types that are passed into a procedure or function and that provide an efficient way to pass multiple rows of data to a client application 137 at the application server 135). Inputs can be connected to tables or to the outputs of other nodes. A calculation scenario 215 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 215 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, they can use a split. Then, the nodes can be automatically multiplied between split and merge and partition the data.

A calculation scenario 215 can be defined as part of database metadata and invoked multiple times. A calculation scenario 215 can be created, for example, by a SQL statement "CREATE CALCULATION SCENARIO <NAME> USING <XML or JSON>". Once a calculation scenario 215 is created, it can be queried (e.g., "SELECT A, B, C FROM <scenario name>", etc.). In some cases, databases can have pre-defined calculation scenarios 215 (e.g., defaults, those previously defined by users, etc.). Calculation scenarios 215 can be persisted in a repository (coupled to the database server 240) or in transient scenarios. Calculation scenarios 215 can also be kept in-memory.

Calculation scenarios 215 may be considered more powerful than traditional SQL queries or SQL views for many reasons. One reason is the possibility to define parameterized calculation schemas that are specialized when the actual query is issued. Unlike a SQL view, a calculation scenario 215 does not necessarily describe the actual query to be executed. Rather, it can describe the structure of the calculation. Further information can be supplied when the calculation scenario is executed. This further information may include parameters that represent values (for example in filter conditions). To provide additional flexibility, the operations can optionally also be refined upon invoking the calculation model. For example, at definition time, the calculation scenario 215 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and the like supplied with the invocation to instantiate a query specific calculation scenario 215. This instantiated calculation scenario 215 is optimized for the actual query and does not contain attributes, nodes or data flows that are not needed for the specific invocation. For example, as described herein, a calculation scenario 215 can comprise a hierarchical join, which may be optimized by the calculation engine 220 prior to execution.

When the calculation engine 220 gets a request to execute a calculation scenario 215, it can first optimize the calculation scenario 215 using a rule based model optimizer 222. Examples for optimizations performed by the model optimizer 222 can include "push down" filters and projections so that intermediate results 226 are narrowed down earlier in compilation or execution, or the combination of multiple aggregation and join operations into one node. The optimized model can then be executed by a calculation engine model executor 224 (a similar or the same model executor can be used by the database directly in some cases). This can include decisions about parallel execution of operations in the calculation scenario 215. The model executor 224 can invoke the required operators (using, for example, a calculation engine operators module 228) and manage intermediate results 226. Most of the operators can be executed directly in the calculation engine 220 (e.g., creating the union of several intermediate results 226). The remaining nodes of the calculation scenario 215 (not implemented in the calculation engine 220) can be transformed by the model executor 224 into a set of logical database execution plans. Multiple set operation nodes can be combined into one logical database execution plan if possible.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

A calculation scenario 215 as described herein can include a type of node referred to herein as a semantic node (or sometimes semantic root node). In some aspects, a database modeler can flag the root node (output) in a graphical calculation view to which the queries of the database applications are directed as semantic node. This arrangement allows the calculation engine 220 to easily identify those queries and to thereby provide a proper handling of the query in all cases.

The calculation scenarios 215 used by the calculation engine 220 can be exposed as a special type of database view called a graphical calculation view. For example, relational (e.g., SQL) views may be stacked on top of the calculation scenarios 215. Stacking in this manner may allow for a user to customize the front end of a program which utilizes calculation scenarios 215. A calculation view can be used in SQL queries and can be combined with tables and standard views using joins and sub queries. When such a query is executed, the database executor inside the SQL processor (not shown) needs to invoke the calculation engine 220 to execute the calculation scenario 215 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

Figure 3:
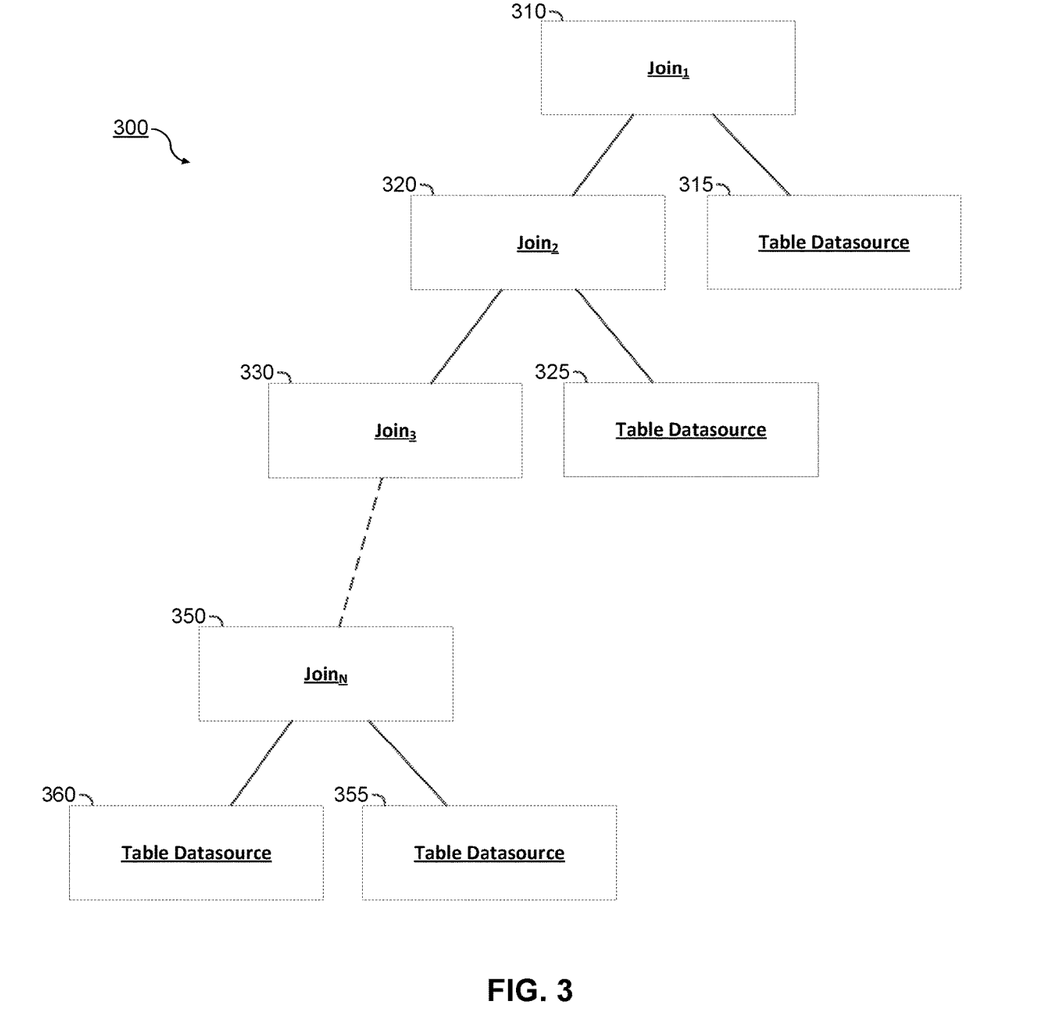
FIG. 3 is a diagram that illustrates an unoptimized model of a calculation scenario comprising a plurality of hierarchical joins.

FIG. 3 is a diagram that illustrates an unoptimized model of a calculation scenario 300 including a hierarchical join. In some aspects, the calculation scenario 300 may be similar to the calculation scenario 215 of FIG. 2. As illustrated, the hierarchical (also referred to as "stacked" or "chained") join includes 1 to N joins 310-350. Although the joins 310-350 are illustrated in a hierarchical manner, the order of the joins 310-350 is not always needed to obtain the result, and may be rearranged (e.g., via a join reordering optimization). A join may be defined as the combination of two or more sources. Whenever more than two sources are joined, more than one join operation may be necessary. For example, the illustrated hierarchical join provides a mechanism for joining more than two sources, one join at a time. In various implementations, a join includes an intersection of two or more data sources. The results of the intersection can vary based on the type of join utilized. As examples, a join can cross joins, inner joins, outer joins, star joins, etc.

As illustrated, each join includes a "left part" and a "right part" which are the two child nodes of their respective parent or root node (e.g., of the join node). The left part and the right part may comprise the data sources from which the intersection of a join operation is formed. For example, $join_1$ 310 includes $join_2$ 320 as a left part and table datasource 315 as a right part, $join_2$ 320 includes $join_3$ 330 as a left part and table datasource 325 as a right part, and $join_N$ 350 includes datasource 360 as a left part and table datasource 355 as a right part. In some aspects, the table datasources 315, 325, 360, 355 include data from a database in the form of a table, each comprising one or more rows and columns.

Although each of the joins 310-350 are illustrated as including a table datasource 315-355 as a right part, any one of the joins 310-350 may instead also include a join or any other calculation engine 220 operation as its right part. For example, one or more of the joins 310-350 in the hierarchical join may be a join of two separate joins. Although each of the joins 310-350 are represented as the intersection of two nodes, any one of the joins may be defined as the intersection of more than two nodes. In some aspects, the computation of each join 310-350 may be required before a preceding join can be computed. For example, $join_3$ 330 must be computed before $join_2$ 320, and so on. Accordingly, the time and computational resources necessary to calculate the result of a hierarchical join can be large, and may also slow down or delay the execution of other operations or processes. As such, optimizations of the calculation scenario 300 comprising a hierarchical join may be desirable.

Figure 4:
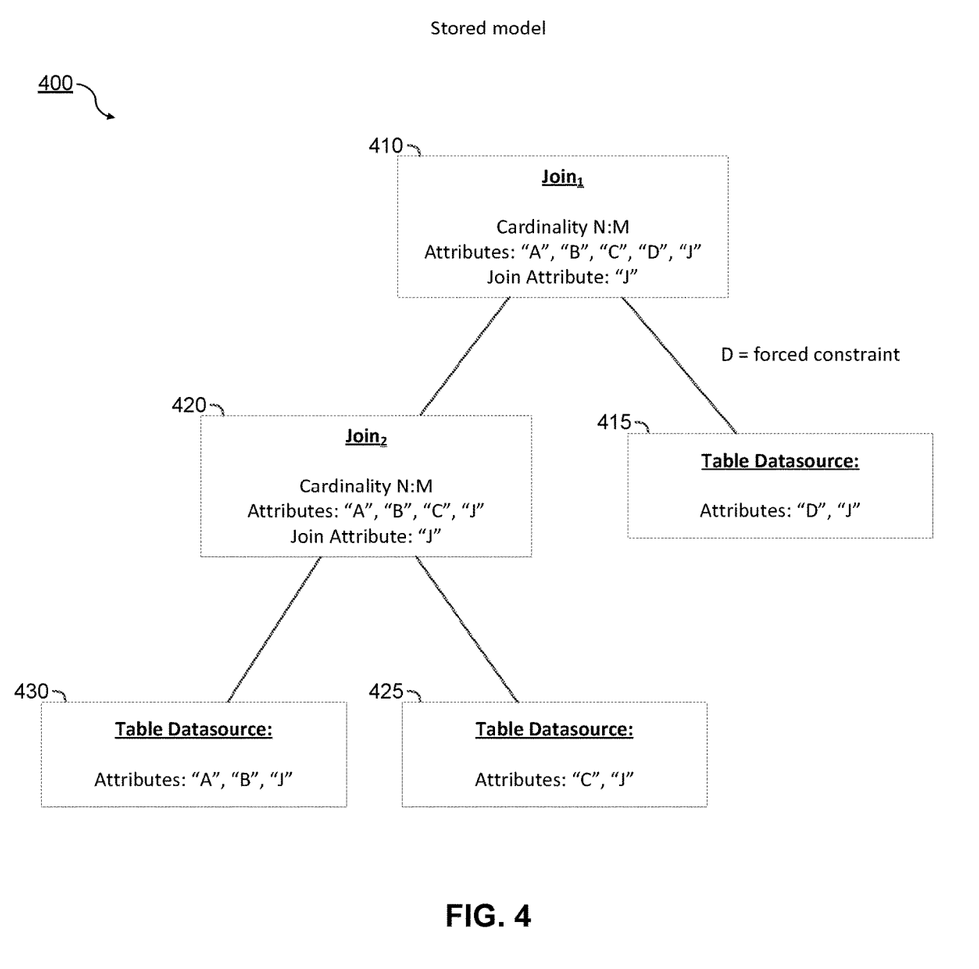
FIG. 4 is another diagram that illustrates an unoptimized model of a calculation scenario comprising a plurality of hierarchical joins.

FIG. 4 is another diagram that illustrates an unoptimized model of a calculation scenario 400 including a hierarchical join. In some aspects, the hierarchical join may be a representation of a calculation scenario formed through a calculation view. The calculation view can be designed by a user for performing specified operations to obtain data from a database. For example, as illustrated, the calculation view may include a plurality of join operations. Although not illustrated, operations other than joins may be present within the calculation scenario 400. In an implementation, the calculation engine 220 of FIG. 2 traverses through the calculation scenario 400 to determine what portions of the hierarchical join may be optimized. An optimized instance of the hierarchical join may be stored as a result and executed instead of the original (unoptimized) instance. This process may speed up execution of the calculation scenario 400.

In an implementation, the calculation engine may be configured to detect whether a join in the calculation scenario 400 is of cardinality N:M, N:1, 1:N, or meets some other criteria (also referred to herein as a "threshold"). The cardinality of a join may be defined as a number of rows in the operands (e.g., child nodes) of a join which may match with each other. For example, N:M means that a row in the left part of a join (e.g., within a table structure output by the left part) may have a match with 0 to N rows in the right part of the join (e.g., within a table structure output by the right part), and that a row in the right table may have a match with 0 to M rows in the left part. Similarly, cardinality 1:N means that a row of the left part of a join may have 0 to N matches in the right part of the join and a row of the right part may have 0 to 1 matches in the left part. In some aspects, the cardinality can be set by a user (e.g., developer) who creates the calculation scenario 400, and may be stored at the individual join operations 410, 420. In some implementations, cardinality of N:M can be set as the default when the user does not specify otherwise. If it is determined that a join is of cardinality N:M, N:1, or 1:N, then the join may be optimizable in accordance with the processes or methods described herein. In some aspects, while both the left part and the right part of a join with cardinality N:M may be optimizable, only the left part of a join with cardinality N:1 may be optimizable, and only the right part of a join with cardinality 1:N may be optimizable.

In some aspects, the calculation engine 220 traverses through the calculation scenario and caches an indication of when there are "forced constraints" upon the datasource. As referred to herein, a forced constraint may be regarded as a data filter upon a datasource (e.g., a static filter created during design time of the calculation scenario 300). For example a forced constraint within a join operation may be set to "year"="2000" to represent that only data from the year 2000 will be retrieved from the table datasource of interest when the join is executed. Removing forced constraints from a join operation would therefore void this filter, and may generate unnecessary results. As such, when the calculation engine 220 parses through the calculation scenario, it may be configured to detect whether a forced constraint exists within each individual join of the hierarchical join. Detection can include determining whether a filter (e.g., "constraint"="[value||string]") exists upon a data table which is a source for the join.

For every join operation identified as optimizable, the calculation engine 220 can traverse the calculation graph (e.g., hierarchical join) to the bottom to search for force constraints. For example, with respect to the calculation scenario 400, the calculation graph may be traversed starting from $Join_1$ 410 while optimizing $Join_1$ 410. Specifically, if a forced constraint is identified in the left part or the right part of $Join_1$ 410, then an indication of the presence of the forced constraint is cached at $Join_1$ 410. Additionally or alternatively, any joins in the sub-graph of the left part or the sub-graph of the right part of $Join_2$ 410 which contain forced constraints may be identified, and an indication that a force constraint is present may be stored at the identified join. Thereafter, the sub-graph starting at $Join_2$ 420 may be traversed again while optimizing $Join_2$ 420. However, since the whole sub-graph starting at $Join_2$ 420 was traversed while optimizing $Join_1$ 410, the cached information on whether this sub-graph contains forced constraints can be reused when optimizing $Join_2$ 420. In some implementations, the indication of whether a join or datasource includes a forced constraint can be cached as metadata at the join or datasource, respectively.

Similarly, the calculation engine 220 may be configured to determine whether a join requests an attribute from a child node (e.g., the right part). This detection may include determining whether the only attribute accessed from a datasource is the join attribute itself. In some aspects, attributes can generally refer to a value of a column, row, or other field of data within a database table. Similarly, a join attribute can refer to a field of data which is common between two joined datasources, and upon which the resulting intersection is defined. If neither a forced constraint nor a requested attribute (aside from the join attribute) is detected upon a datasource, then the datasource may be pruned from the hierarchical join in an optimized instance of the calculation scenario 400.

As illustrated, the calculation scenario 400 comprises $Join_1$ 410 and $Join_2$ 420. $Join_1$ 410 is a root node defined as the intersection of $Join_2$ 420 and table datasource 415. As illustrated, $Join_1$ 410 is of cardinality N:M. Thus, it may be determined that $Join_1$ 410 is potentially optimizable. As further illustrated, $Join_1$ 410 includes attributes A, B, C, D, and J, wherein attribute J is a join attribute. In the illustrated example, $Join_1$ 410 may obtain attributes D and J from table datasource 415, and may obtain attributes A, B, C, and J from a result of $Join_2$ 420. In this example, attribute D may be a forced constraint. Thus, it may be determined that table datasource 415 should not be pruned from the optimized instance.

As illustrated, $Join_2$ 420 is defined as the intersection of table datasource 430 (left part) and table datasource 425 (right part), based upon J as the join attribute. In the illustrated example, table datasource 430 includes attributes A, B, and J and table datasource 425 includes attributes C and J. In this example, attribute C may be determined to be a requested attribute. Thus, it may be determined that table datasource 425 cannot be pruned from an optimized instance.

Figure 5:
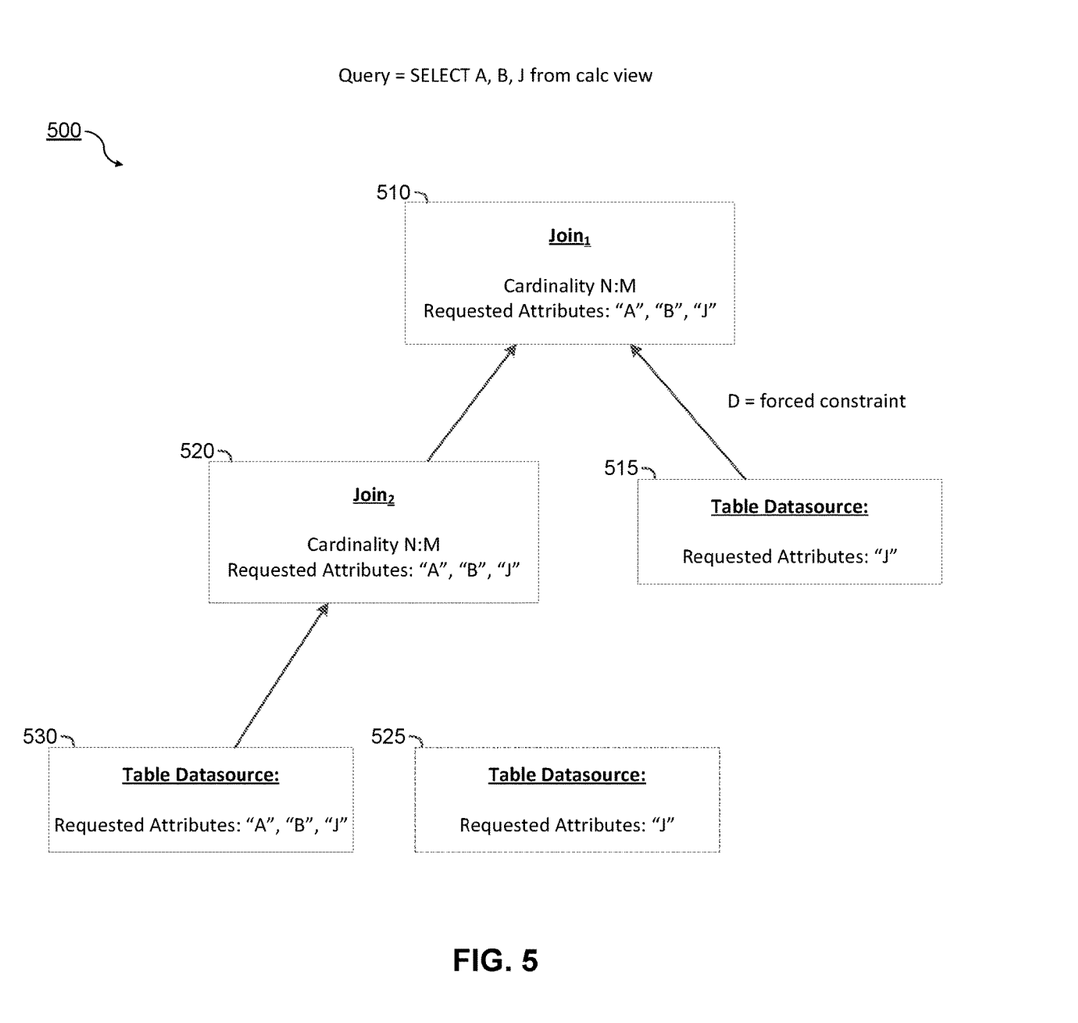
FIG. 5 is a diagram that illustrates an optimized model of a calculation scenario comprising a plurality of hierarchical joins.

FIG. 5 is a diagram that illustrates an optimized model of a calculation scenario 500 including a hierarchical join. Specifically, calculation scenario 500 may include an optimized instance of a query (e.g., query=SELECT A, B, J from calc view) based upon the calculation scenario 400. As illustrated, the calculation scenario 500 comprises $Join_1$ 510 and $Join_2$ 520. $Join_1$ 510 is a root node defined as the intersection of $Join_2$ 520 and table datasource 515. As illustrated, $Join_1$ 510 and $Join_2$ 520 are of cardinality N:M.

As further illustrated, Join$_1$ 510 includes the requested attributes of A, B, and J, wherein attribute J is a join attribute. In the illustrated example, Join$_1$ 510 may obtain attribute J from table datasource 515, and may obtain attributes A, B, and J from a result of Join$_2$ 520. Although there may not be a requested attribute from table datasource 515, it may still have the forced constraint D. Thus, table datasource 515 is not pruned from the optimized instance. As described above, the presence of the forced constraint on table datasource 515 may be detected, and an indication that the forced constraint is present may be cached in the Join$_1$ 510 or the table datasource 515. Thus, later optimizations of the calculation scenario 500 may not be required to make this determination, and query execution may be sped up.

As illustrated, Join$_2$ 520 is defined as the intersection of table datasource 530 (left part) and table datasource 525 (right part), based upon J as the join attribute. In the illustrated example, table datasource 530 includes requested attributes A, B, and J and table datasource 525 includes attribute J. In this example, there are no additional requested attributes beyond the join attribute from table datasource 525 because J is the join attribute. Thus, table datasource 525 is pruned from the optimized instance.

During execution time of the query, the calculation engine 220 can execute the calculation scenario 500, which contains the optimized instance. As the optimized instance requires less calculations to be performed, the runtime and processing resources necessary may be reduced.

Figure 6:
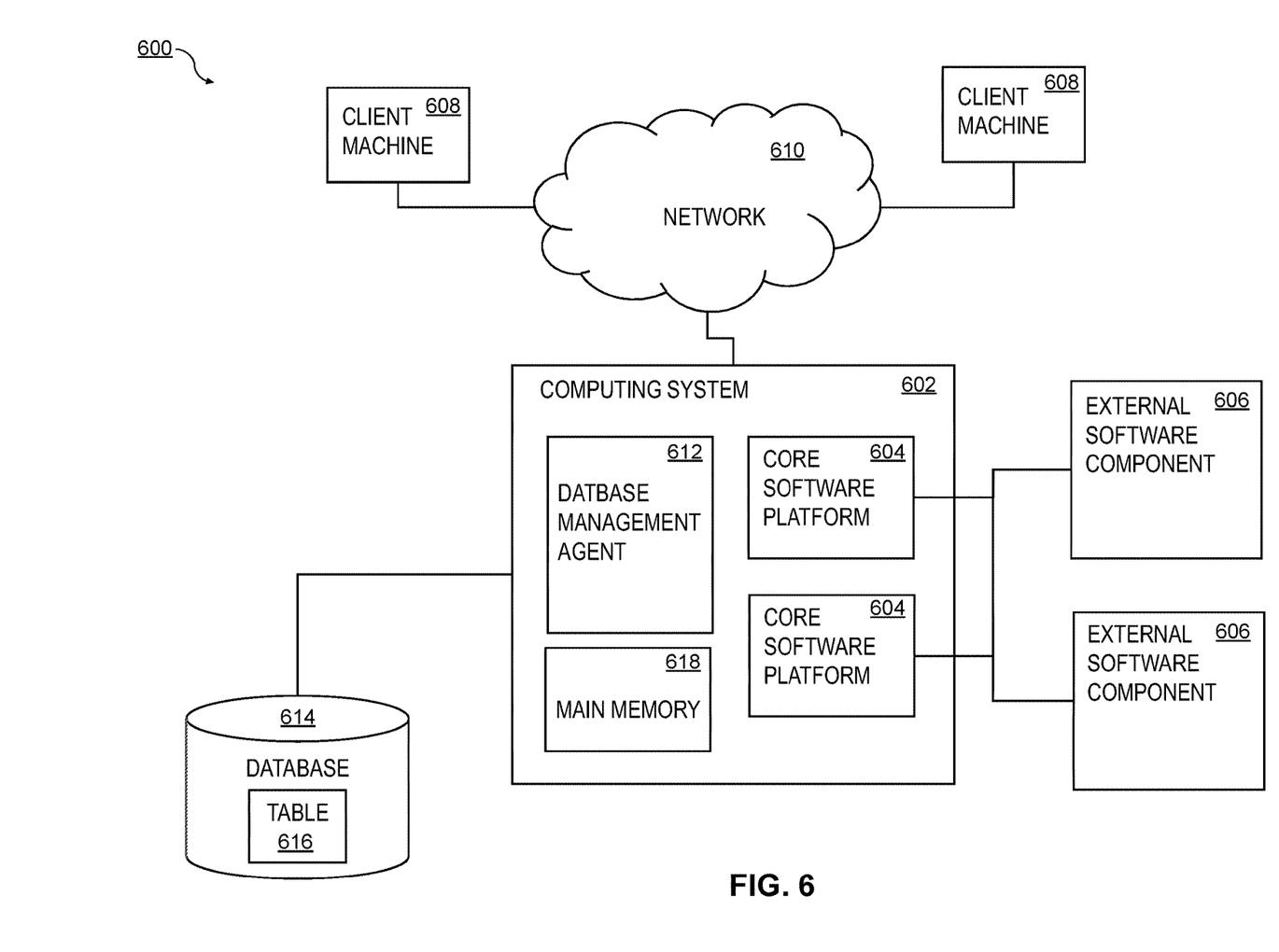
FIG. 6 is a diagram of a system that can implement one or more features consistent with the current subject matter.

FIG. 6 is a diagram of a system 600 that can implement one or more features consistent with the current subject matter. A computing system 602 can include one or more core software platform modules 604 providing one or more features of a high-level programming software system or other software that includes database management features. The computing system can also aggregate or otherwise provide a gateway via which users can access functionality provided by one or more external software components 606. One or more client machines 608 can access the computing system, either via a direct connection, a local terminal, or over a network 610 (e.g. a local area network, a wide area network, a wireless network, the Internet, or the like).

A database management agent 612 or other comparable functionality can access a database 614 that includes at least one table 616, which can in turn include at least one column. The database management agent 612 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 612 or other comparable functionality can be configured to load a database table 616, or other comparable data set, into the main memory 618. The database management agent 612 can be configured to load the information from the database 614 to the main memory 618 in response to receipt of a query instantiated by a user or computer system through one or more client machines 608, external software components 606, core software platforms 604, or the like. At least a portion of the illustrated system 600 may be implemented as a database management system (e.g., not including the client machines 608, the network 610, and/or the external software components 606).

In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

Figure 7:
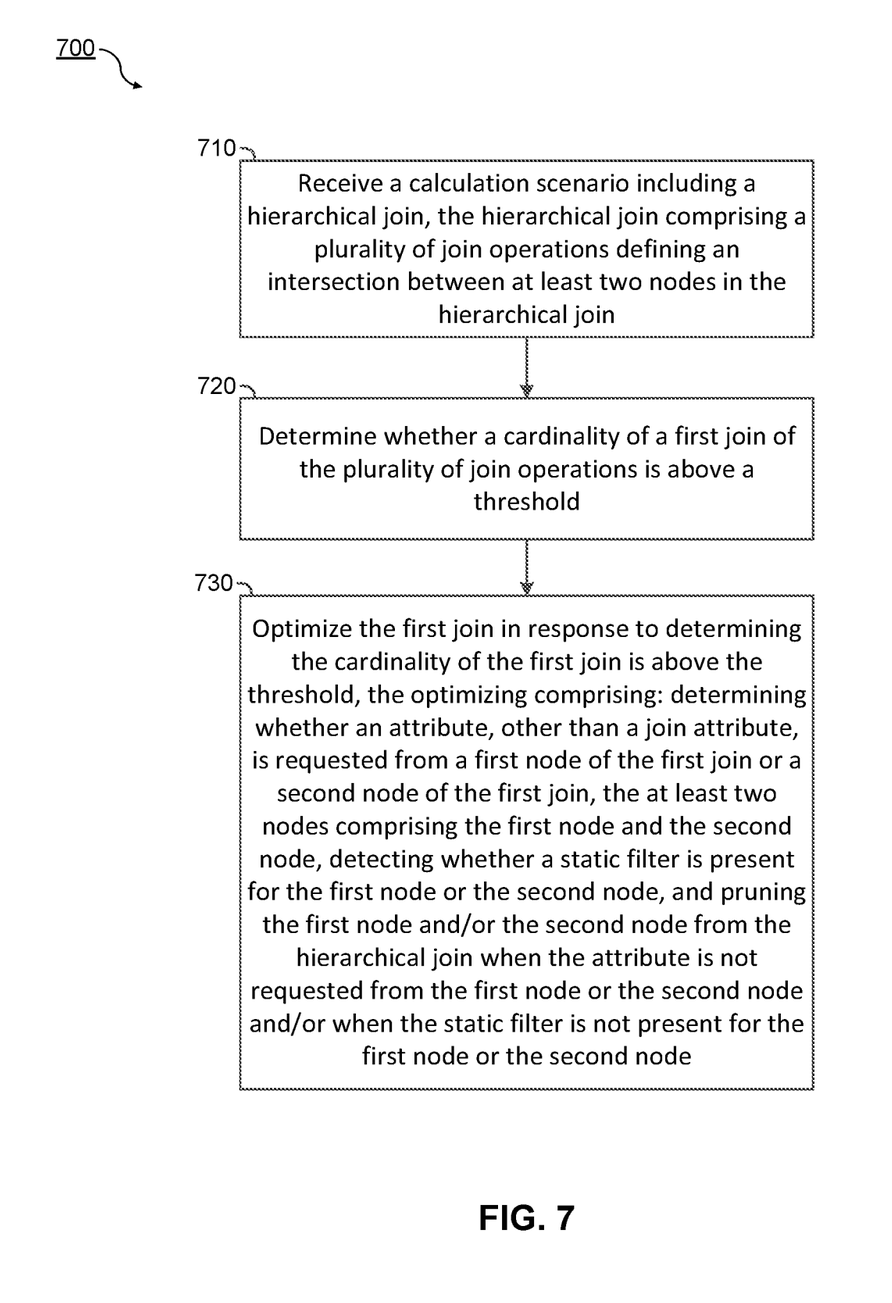
FIG. 7 is a process flow diagram illustrating an exemplary method of processing a calculation scenario for executing a query.

FIG. 7 is a process flow diagram illustrating an exemplary method 700 of processing a calculation scenario for executing a query. In various implementations, the method 700 may be performed by the calculation engine 220 of FIG. 2, the computing system 602 of FIG. 6, or other hardware and/or software components described herein, or equivalents thereof. Although illustrated in linear fashion, in various implementations, the steps of the method 700 may be executed in a different order, and not all of the steps of method 700 may be required or executed.

At operational block 710 the calculation engine 220, for example, receives a calculation scenario including a hierarchical join, the hierarchical join comprising a plurality of join operations defining an intersection between at least two nodes in the hierarchical join. In some aspects, the at least two nodes individually comprise at least one of a first join from the plurality of join operations, a second join from the plurality of join operations, a first database partition from a plurality of database partitions, and a second database partition from the plurality of database partitions. In an exemplary implementation, the plurality of database partitions comprise table partitions that hold data from a database (e.g., a table datasource). In some aspects, the calculation scenario can include one or more database queries.

At operational block 720 the calculation engine 220, for example, determines whether a cardinality of a first join of the plurality of join operations is above a threshold. In some aspects, the cardinality comprises an indication of a number of rows matching between resulting tables of the first node and the second node of the first join.

At operational block 730 the calculation engine 220, for example, optimizes the first join. As illustrated, the optimizing comprises determining whether an attribute, other than a join attribute, is requested from a first node of the first join or a second node of the first join, the at least two nodes comprising the first node and the second node. The optimization further comprises detecting whether a static filter is present for the first node or the second node. In some aspects, the detecting may not occur when the attribute, other than the join attribute is requested. The optimization further comprises pruning the first node and/or the second node from the hierarchical join when the attribute is not requested from the first node or the second node and/or when the static filter is not present for the first node or the second node. The pruning may mean pruning the node(s) from the calculation scenario. In some implementations, the calculation engine 220, for example, may only prune the first node from the hierarchical join when the attribute is not requested from the first node and the static filter is not present for the first node (e.g., a static filter upon the first node itself or a static filter upon any of the nodes in the sub-graph of the first node). Similarly, in some implementations, the calculation engine 220, for example, may only prune the second node from the hierarchical join when the attribute is not requested from the second node and the static filter is not present for the second node.

In some aspects, optimizing the first join can further comprise caching an indication that the static filter is present when the static filter is detected. For example, the indication may be cached in the first join, in the first node, and/or in the second node, depending on the location of the static filter. In some implementations, the optimizing occurs after it is determined that the cardinality of the first join is above the threshold in operational block 720.

In some aspects, the (determined) attribute comprises a field within a resulting first data table of the first node or second data table of the second node, and the join attribute comprises a field common between the first data table and the second data table. In various implementations, the static filter comprises a filter of the first node or the second node based on a specified alphanumeric constraint. In some aspects, detecting whether a static filter is present for the first node or the second node comprises determining whether the first join comprises the static filter. Additionally, the calculation engine 220, for example, may determine whether any node in a sub-graph of the first node comprises a static filter, and/or may determine whether any node in a sub-graph of the second node comprises a static filter.

In some implementations, method 700 may be repeated, in whole or in part, for each of the nodes in a calculation scenario, or at least a portion thereof. In some implementations, the calculation engine can comprise at least one programmable processor and at least one memory storing instructions that, when executed by the at least one programmable processor to implement the receiving, the executing, the converting, and the providing of operational blocks 710-740.

Without in any way limiting the scope, interpretation, or application of the claims appearing below, a technical effect of one or more of the example embodiments disclosed herein is more efficient execution of complex calculation scenarios while allowing a developer to develop less complex software. For example, new software for databases may be deployed on top of currently existing software while still maintaining some of the benefits of the existing software and gaining additional benefits from the new software. Another technical effect can be that complex databases queries may be simplified for execution, providing for faster execution of complex calculation scenarios while allowing developers the freedom to develop such complex calculations scenarios.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein.

Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, at a calculation engine of a database management system, a query invoking a calculation scenario including a hierarchical join, the hierarchical join comprising a plurality of nodes, each of the plurality of nodes corresponding to a data source comprising a join operation or one of a plurality of database partitions;
instantiating, by the calculation engine, the calculation scenario, the instantiating of the calculation scenario optimizing the calculation scenario by at least:
determining, by the calculation engine, whether a cardinality of a first join operation in the hierarchical join is above a threshold, the first join operation operating on a first node comprising a first data source, the first join operation further operating a second node comprising a second data source, and the first join operation combining, based at least on a join attribute, data from the first data source and the second data source;
optimizing, by the calculation engine, the first join operation in response to determining the cardinality of the first join operation is above the threshold, the optimizing of the first join operation comprising:
determining that no attributes other than the join attribute is requested from the first node,
determining whether a static filter is present for the first node, the static filter preventing at least a portion of data from being retrieved from the first data source comprising the first node,
in response to detecting that the static filter is present for the first node, caching, at the first join operation, an indication of the presence of the static filter, the cached indication being reused during optimization of a second join operation that is subordinate to the first node in the hierarchical join, and
in response to determining that the static filter is absent from the first node and that no attributes other than the join attribute is requested from the first node, pruning the first node from the hierarchical join; and
executing, by the calculation engine, the query by at least performing the hierarchical join included in the optimized calculation scenario, the performing of the hierarchical join including performing the optimized first join operation without the first node pruned from the first join operation.

2. The method of claim 1, wherein the attribute comprises a field within the first data source comprising the first node, and wherein the join attribute comprises a field that is common between the first data source comprising the first node and the second data source comprising the second node.

3. The method of claim 1, wherein the first node and the second node each comprise a second join operation in the hierarchical join, a database partition from a plurality of database partitions, and/or a relational operation other than a join operation.

4. The method of claim 1, wherein each of the plurality of database partitions comprises a table partition holding data from a database associated with the database management system.

5. The method of claim 1, wherein the static filter is configured to filter the first data source comprising the first node based on a specified alphanumeric constraint, and wherein detecting whether the static filter is present for the first node comprises determining whether the first join operation comprises the static filter.

6. The method of claim 1, wherein the cardinality comprises an indication of a quantity of matching rows from the first data source comprising the first node and the second data source comprising the second node.

7. The method of claim 1, wherein the calculation scenario comprises one or more database queries.

8. The method of claim 1, wherein the calculation engine comprises at least one programmable processor and at least one memory storing instructions that, when executed by the at least one programmable processor to implement the receiving, the executing, and the converting.

9. A non-transitory computer program product storing instructions which, when executed by at least one hardware data processors, result in operations comprising:
receiving, at a calculation engine of a database management system, a query invoking a calculation scenario including a hierarchical join, the hierarchical join comprising a plurality of nodes, each of the plurality of nodes corresponding to a data source comprising a join operation or one of a plurality of database partitions;
instantiating, by the calculation engine, the calculation scenario, the instantiating of the calculation scenario optimizing the calculation scenario by at least:
determining, by the calculation engine, whether a cardinality of a first join operation in the hierarchical join is above a threshold, the first join operation operating on a first node comprising a first data source, the first join operation further operating a second node comprising a second data source, and the first join operation combining, based at least on a join attribute, data from the first data source and the second data source;
optimizing, by the calculation engine, the first join operation in response to determining the cardinality of the first join operation is above the threshold, the optimizing of the first join operation comprising:
determining that no attributes other than the join attribute is requested from the first node,
determining whether a static filter is present for the first node, the static filter preventing at least a portion of data from being retrieved from the first data source comprising the first node,
in response to detecting that the static filter is present for the first node, caching, at the first join operation, an indication of the presence of the static filter, the cached indication being reused during optimization of a second join operation that is subordinate to the first node in the hierarchical join, and in response to determining that the static filter is absent from the first node and that no attributes other than the join attribute is requested from the first node, pruning the first node from the hierarchical join; and executing, by the calculation engine, the query by at least performing the hierarchical join included in the optimized calculation scenario, the performing of the hierarchical join including performing the optimized first join operation without the first node pruned from the first join operation.

10. The non-transitory computer program product of claim 9, wherein the attribute comprises a field within the first data source comprising the first node, and wherein the join attribute comprises a field that is common between the first data source comprising the first node and the second data source comprising the second node.

11. The non-transitory computer program product of claim 9, wherein the first node and the second node each comprise a second join operation in the hierarchical join, a database partition from a plurality of database partitions, and/or a relational operation other than a join operation.

12. The non-transitory computer program product of claim 9, wherein the static filter is configured to filter the first data source comprising the first node based on a specified alphanumeric constraint, and wherein detecting whether the static filter is present for the first node comprises determining whether the first join operation comprises the static filter.

13. A system comprising:
at least one hardware data processor; and
at least one memory storing instructions which, when executed by the at least one data processor, result in operations comprising:
receiving, at a calculation engine of a database management system, a query invoking a calculation scenario including a hierarchical join, the hierarchical join comprising a plurality of nodes, each of the plurality of nodes corresponding to a data source comprising a join operation or one of a plurality of database partitions;
instantiating, by the calculation engine, the calculation scenario, the instantiating of the calculation scenario optimizing the calculation scenario by at least:
determining, by the calculation engine, whether a cardinality of a first join operation in the hierarchical join is above a threshold, the first join operation operating on a first node comprising a first data source, the first join operation further operating a second node comprising a second data source, and the first join operation combining, based at least on a join attribute, data from the first data source and the second data source;
optimizing, by the calculation engine, the first join operation in response to determining the cardinality of the first join operation is above the threshold, the optimizing of the first join operation comprising:
determining that no attributes other than the join attribute is requested from the first node,
determining whether a static filter is present for the first node, the static filter preventing at least a portion of data from being retrieved from the first data source comprising the first node,
in response to detecting that the static filter is present for the first node, caching, at the first join operation, an indication of the presence of the static filter, the cached indication being reused during optimization of a second join operation that is subordinate to the first node in the hierarchical join, and
in response to determining that the static filter is absent from the first node and that no attributes other than the join attribute is requested from the first node, pruning the first node from the hierarchical join; and
executing, by the calculation engine, the query by at least performing the hierarchical join included in the optimized calculation scenario, the performing of the hierarchical join including performing the optimized first join operation without the first node pruned from the first join operation.

14. The system of claim 13, wherein the attribute comprises a field within the first data source comprising the first node, and wherein the join attribute comprises a field that is common between the first data source comprising the first node and the second data source comprising the second node.

15. The system of claim 13, wherein the first node and the second node each comprise a second join operation in the hierarchical join, a database partition from a plurality of database partitions, and/or a relational operation other than a join operation.

16. The system of claim 13, wherein the static filter is configured to filter the first data source comprising the first node based on a specified alphanumeric constraint, and wherein detecting whether the static filter is present for the first node comprises determining whether the first join operation comprises the static filter.

* * * * *